US012365174B2

(12) United States Patent
Steadman et al.

(10) Patent No.: US 12,365,174 B2
(45) Date of Patent: Jul. 22, 2025

(54) INK TRAY INSERT

(71) Applicant: Eastman Kodak Company, Rochester, NY (US)

(72) Inventors: Jason D. Steadman, Rochester, NY (US); Michael G. Shaughnessy, Hemlock, NY (US); Carolyn Rae Ellinger, Rochester, NY (US)

(73) Assignee: Eastman Kodak Company, Rochester, NY (US)

( * ) Notice: Subject to any disclaimer, the term of this patent is extended or adjusted under 35 U.S.C. 154(b) by 0 days.

(21) Appl. No.: 18/244,973

(22) Filed: Sep. 12, 2023

(65) Prior Publication Data

US 2025/0083434 A1 Mar. 13, 2025

(51) Int. Cl.
*B41F 31/06* (2006.01)
*B41F 5/24* (2006.01)

(52) U.S. Cl.
CPC ................ *B41F 31/06* (2013.01); *B41F 5/24* (2013.01)

(58) Field of Classification Search
CPC .................................. B41F 31/06; B41F 5/24
See application file for complete search history.

(56) References Cited

U.S. PATENT DOCUMENTS

| | | | | |
|---|---|---|---|---|
| 581,201 | A * | 4/1897 | Haddon et al. | B41F 9/02 101/152 |
| 3,073,240 | A * | 1/1963 | Tyma, Jr. | B41F 31/18 101/364 |
| 4,165,688 | A | 8/1979 | Leanna et al. | |
| 9,233,531 | B2 | 1/2016 | Shifley et al. | |
| 9,322,093 | B2 | 4/2016 | Pekurovsky | |
| 9,327,489 | B2 | 5/2016 | Shifley et al. | |
| 9,327,494 | B1 | 5/2016 | Smith et al. | |
| 9,346,260 | B2 | 5/2016 | Shifley et al. | |
| 9,504,164 | B2 | 11/2016 | Ramakrishnan et al. | |
| 9,522,524 | B2 | 12/2016 | VanOstrand et al. | |
| 9,669,617 | B2 | 6/2017 | VanOstrand et al. | |
| 9,762,235 | B2 | 9/2017 | Stone | |
| 9,766,732 | B2 | 9/2017 | Gilman et al. | |
| 9,807,871 | B2 | 10/2017 | Theis et al. | |
| 11,072,165 | B2 | 7/2021 | Smith et al. | |
| 11,135,832 | B2 | 10/2021 | Smith et al. | |

(Continued)

FOREIGN PATENT DOCUMENTS

GB 1478930 A 7/1977

*Primary Examiner* — Stephen D Meier
*Assistant Examiner* — Leo T Hinze
(74) *Attorney, Agent, or Firm* — David A. Novais; J. Lanny Tucker

(57) ABSTRACT

An ink tray insert is adapted to be inserted into a conventional ink tray in a printing system. The ink tray insert includes a bottom surface having an outer profile that substantially conforms to an inner profile of a bottom surface of the conventional ink tray, and left and right side walls that extend upwards from left and right edges of the bottom surface, respectively. Bearing saddles are mounted on the left and right side walls adapted to receive bearings mounted on a shaft of a fountain roller, the ink tray insert being adapted to supply ink to the fountain roller in an ink transfer zone. A cross-track width of the ink tray insert between the left and right side walls is less than a cross-track width of the conventional ink tray.

9 Claims, 15 Drawing Sheets

(56) References Cited

U.S. PATENT DOCUMENTS

| | | | | |
|---|---|---|---|---|
| 2009/0078134 | A1* | 3/2009 | Rothlein | H02K 7/086 101/141 |
| 2014/0295063 | A1 | 10/2014 | Petcavich et al. | |
| 2016/0168713 | A1 | 6/2016 | Reuter et al. | |
| 2020/0189263 | A1 | 6/2020 | Smith et al. | |
| 2022/0258463 | A1 | 8/2022 | Fleischer et al. | |

* cited by examiner

INK TRAY INSERT

CROSS-REFERENCE TO RELATED APPLICATIONS

Reference is made to commonly assigned, U.S. patent application Ser. No. 18/244,961, entitled: "Inking system with segmented fountain roller," by Steadman et al.; and to commonly assigned, U.S. patent application Ser. No. 18/244,978 entitled: "Inking "Inking system with plurality of fountain roller elements," by Steadman et al.; each of which is incorporated herein by reference.

FIELD OF THE INVENTION

This invention pertains to the field of flexographic printing, and more particularly to inking systems for flexographic printing systems.

BACKGROUND OF THE INVENTION

Processing a web of media in a roll-to-roll fashion can be an advantageous and low-cost manufacturing approach for devices or other objects formed on the web of media. An example of a process that includes web transport through an additive printing system is roll-to-roll flexographic printing.

Co-planar wave guide circuits and touch screens are two examples of electrical devices that can be manufactured using a roll-to-roll additive flexographic printing process. For example, a capacitive touch screen includes a substantially transparent substrate which is provided with electrically conductive patterns that do not excessively impair the transparency-either because the conductors are made of a material, such as indium tin oxide, that is substantially transparent, or because the conductors are sufficiently narrow such that the transparency is provided by the comparatively large open areas not containing conductors. For capacitive touch screens having metallic conductors, it is advantageous for the features to be highly conductive but also very narrow. Capacitive touch screen sensor films are an example of an article having very fine features with improved electrical conductivity resulting from an additive printing system.

U.S. Patent Application Publication 2014/0295063 by Petcavich et al., which is incorporated herein by reference, discloses a method of manufacturing a capacitive touch sensor using a roll-to-roll process to print a conductor pattern on a flexible transparent dielectric substrate. A first conductor pattern is printed on a first side of the dielectric substrate using a first flexographic printing plate and is then cured. A second conductor pattern is printed on a second side of the dielectric substrate using a second flexographic printing plate and is then cured. The ink used to print the patterns includes a catalyst that acts as seed layer during a subsequent electroless plating process. The electrolessly-plated material (e.g., copper) provides the low resistivity in the narrow lines of the grid needed for excellent performance of the capacitive touch sensor. Petcavich et al. indicates that the line width of the flexographically-printed microwires can be 1 to 50 microns.

Flexography is a method of printing or pattern formation that is commonly used for high-volume printing runs. It is typically employed in a roll-to-roll format for printing on a variety of soft or easily deformed materials including, but not limited to, paper, paperboard stock, corrugated board, polymeric films, fabrics, metal foils, glass, glass-coated materials, flexible glass materials and laminates of multiple materials. Coarse surfaces and stretchable polymeric films are also economically printed using flexography.

Flexographic printing members are sometimes known as relief printing members, relief-containing printing plates, printing sleeves, or printing cylinders, and are provided with raised relief images (i.e., patterns of raised features) onto which ink is applied for application to a substrate. While the raised relief images are inked, the recessed relief "floor" should remain free of ink.

Although flexographic printing has conventionally been used in the past for the printing of images, more recent uses of flexographic printing have included functional printing of devices, such as touch screen sensor films, antennas, and other devices to be used in electronics or other industries. Such devices typically include electrically conductive patterns.

To improve the optical quality and reliability of the touch screen, it has been found to be preferable that the width of the grid lines be approximately 2 to 10 microns, and even more preferably to be 4 to 8 microns. In addition, in order to be compatible with high-volume roll-to-roll manufacturing processes, it is preferable for the roll of flexographically printed material to be electrolessly plated in a roll-to-roll electroless plating system. More conventionally, electroless plating is performed by immersing the item to be plated in a tank of plating solution. However, for high volume uniform plating of features on both sides of the web of substrate material, it is preferable to perform the electroless plating in a roll-to-roll electroless plating system.

Flexography is a form of rotary web letterpress, combining features of both letterpress and rotogravure printing, which uses relief plates comprised of flexible rubber or photopolymer plates and fast drying, low viscosity solvent, water-based or UV curable inks fed from an anilox roller. Traditionally, patterns for flexographic printing plates (also known as flexo-masters) are created by bitmap patterns, where one pixel in bitmap image correlates to a dot of the flexographic printing plate. For instance, pixels arranged in a straight line in the bitmap image will turn into a continuous straight line on the flexographic printing plate. For flexographic printing (also known as flexo-printing), a flexible printing plate with a relief image is usually wrapped around a cylinder and its relief image is inked using an anilox roller and the ink is transferred to a suitable printable medium.

Flexographic printing plates typically have a rubbery or elastomeric nature whose precise properties may be adjusted for each particular printable medium. In general, the flexographic printing plate may be prepared by exposing a UV sensitive polymer layer through a photomask, or using other preparation techniques.

Catalytic inks that are useful for fabricating electrical devices using processes such as that described in the aforementioned U.S. Patent Application Publication 2014/0295063 are typically quite expensive. Therefore, supplying a large quantity of ink to fill the ink tray a flexographic printing system can be quite costly, particularly when the fine patterns of conductors require only relatively small amounts of ink.

Commonly-assigned U.S. Pat. Nos. 11,135,832 and 11,072,165 describes a low-volume inking system for a flexographic printing system Some applications of flexographic printing utilize inks that are transparent or have a very low optical density. Examples of such inks would include dielectric inks, adhesive inks and silver nanowire inks. Accordingly, in order to be able to align various patterns printed using different print modules, it is desirable to be able to use an opaque ink to print alignment marks (e.g., along the edges of the printed pattern). U.S. Pat. No. 9,807,871 discloses utilizing a plurality of inking systems to apply different inks to different zones of a printing roll so that fiducial marks can be printed with a high-contrast ink while other portions of the printed pattern can be printed with a low-contrast ink.

There remains a need for a simple inking system for a flexographic printing system that can be used to simultaneously provide different inks to different portions of a printing plate, particularly an inking system which operates with low volumes of the different inks.

SUMMARY OF THE INVENTION

The present invention represents an inking system, comprising:

- an ink tray insert for inserting into a conventional ink tray in a printing system, including:
  - a bottom surface having an outer profile that substantially conforms to an inner profile of a bottom surface of the conventional ink tray; and
  - left and right side walls that extend upwards from left and right edges of the bottom surface, respectively; and
  - bearing saddles mounted on the left and right side walls adapted to receive bearings mounted on a shaft of a fountain roller, the ink tray insert being adapted to supply ink to the fountain roller in an ink transfer zone,
- wherein a cross-track width of the ink tray insert between the left and right side walls is less than a cross-track width of the conventional ink tray.

This invention has the advantage that a conventional ink tray can easily be converted into a segmented ink tray that can be used to supply different inks in different ink transfer zones.

It has the additional advantage that a smaller volume of ink can be used to supply ink to a particular ink transfer zone.

It has the further advantage that the ink tray inserts can be easily removed such that any unused ink can be recovered from the ink tray insert and the ink tray insert can be cleaned and reused.

BRIEF DESCRIPTION OF THE DRAWINGS

It is to be understood that the attached drawings are for purposes of illustrating the concepts of the invention and may not be to scale. Identical reference numerals have been used, where possible, to designate identical features that are common to the figures.

DETAILED DESCRIPTION OF THE INVENTION

The present description will be directed in particular to elements forming part of, or cooperating more directly with, an apparatus in accordance with the present invention. It is to be understood that elements not specifically shown, labeled, or described can take various forms well known to those skilled in the art. It is to be understood that elements and components can be referred to in singular or plural form, as appropriate, without limiting the scope of the invention.

The invention is inclusive of combinations of the embodiments described herein. References to "a particular embodiment" and the like refer to features that are present in at least one embodiment of the invention. Separate references to "an embodiment" or "particular embodiments" or the like do not necessarily refer to the same embodiment or embodiments; however, such embodiments are not mutually exclusive, unless so indicated or as are readily apparent to one of skill in the art. It should be noted that, unless otherwise explicitly noted or required by context, the word "or" is used in this disclosure in a non-exclusive sense.

The example embodiments of the present invention are illustrated schematically and not necessarily to scale for the sake of clarity. One of ordinary skill in the art will be able to readily determine the specific size and interconnections of the elements of the example embodiments of the present invention.

References to upstream and downstream herein refer to direction of flow. Web media moves along a media path in a web advance direction from upstream to downstream. Similarly, fluids flow through a fluid line in a direction from upstream to downstream. In some instances, a fluid can flow in an opposite direction from the web advance direction. For clarification herein, upstream and downstream are meant to refer to the web motion unless otherwise noted.

Figure 1:
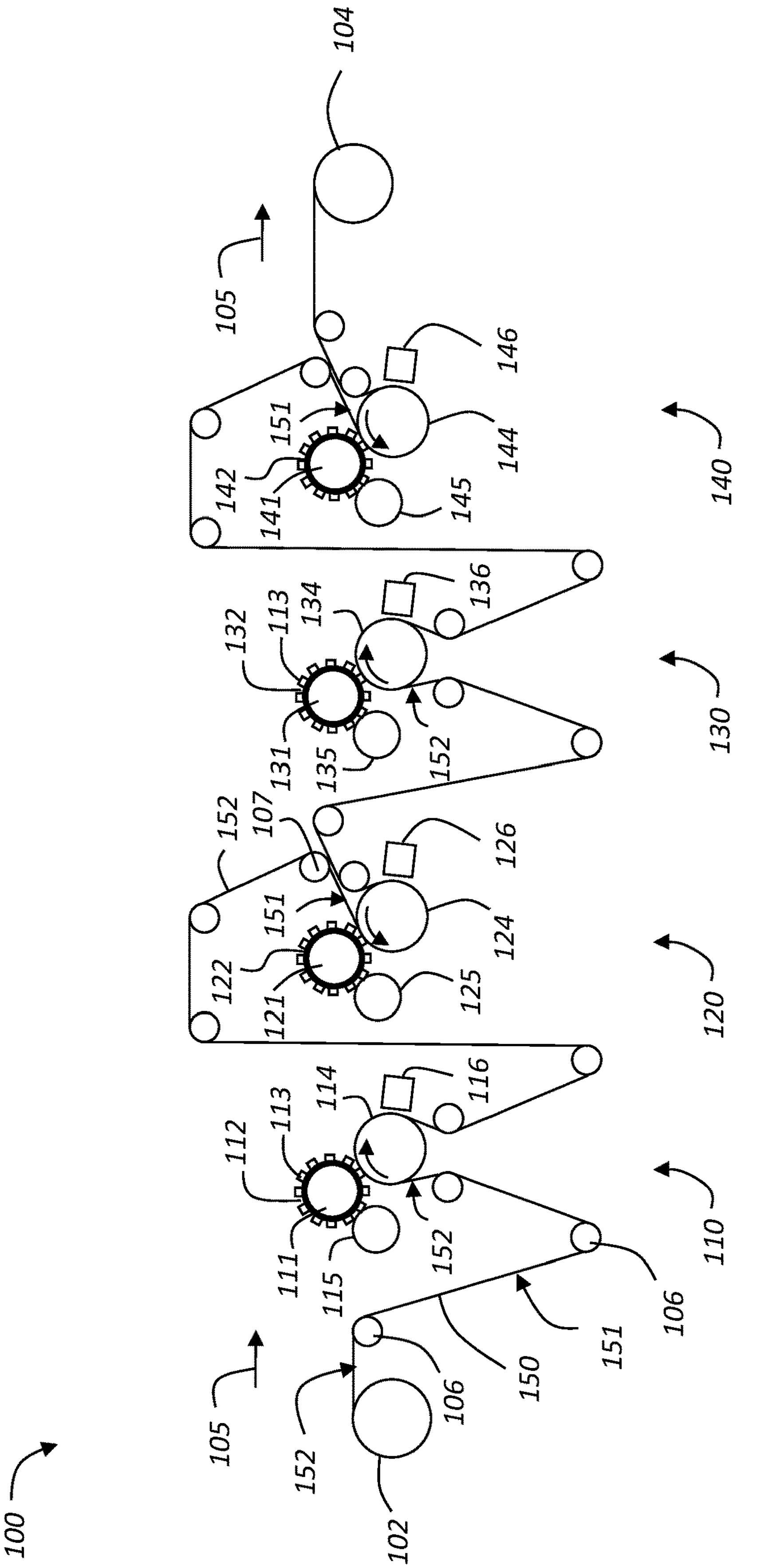
FIG. 1 (Prior Art)
FIG. 1 is a schematic side view of a flexographic printing system for roll-to-roll printing on both sides of a substrate.

FIG. 1 is a schematic side view of a flexographic printing system 100 that can be used in some embodiments of the invention for roll-to-roll printing of a catalytic ink or a conductive ink on both sides of a substrate 150 for subsequent electroless plating. Substrate 150 is fed as a web from supply roll 102 to take-up roll 104 through flexographic printing system 100. Substrate 150 has a first side 151 and a second side 152.

The flexographic printing system 100 includes two print modules 120 and 140 that are configured to print on the first side 151 of substrate 150, as well as two print modules 110 and 130 that are configured to print on the second side 152 of substrate 150. The web of substrate 150 travels overall in process direction 105 (left to right in the example of FIG. 1). However, various rollers 106 and 107 are used to locally change the direction of the web of substrate as needed for adjusting web tension, providing a buffer, and reversing the substrate 150 for printing on an opposite side. In particular, note that in print module 120 roller 107 serves to reverse the local direction of the web of substrate 150 so that it is moving substantially in a right-to-left direction.

Each of the print modules 110, 120, 130, 140 includes some similar components including a respective plate cylinder 111, 121, 131, 141, on which is mounted a respective flexographic printing plate 112, 122, 132, 142, respectively. Each flexographic printing plate 112, 122, 132, 142 has raised features 113 defining an image pattern to be printed on the substrate 150. Each print module 110, 120, 130, 140 also includes a respective impression cylinder 114, 124, 134, 144 that is configured to force a side of the substrate 150 into contact with the corresponding flexographic printing plate 112, 122, 132, 142. Impression cylinders 124 and 144 of print modules 120 and 140 (for printing on first side 151 of substrate 150) rotate counter-clockwise in the view shown in FIG. 1, while impression cylinders 114 and 134 of print modules 110 and 130 (for printing on second side 152 of substrate 150) rotate clockwise in this view. Each print module 110, 120, 130, 140 also includes a respective anilox roller 115, 125, 135, 145 for providing ink to the corresponding flexographic printing plate 112, 122, 132, 142. As is well known in the printing industry, an anilox roller is a hard cylinder, usually constructed of a steel or aluminum core, having an outer surface containing millions of very fine dimples, known as cells. Ink is provided to the anilox roller by a tray or chambered reservoir (not shown). In some embodiments, some or all of the print modules 110, 120, 130, 140 also include respective UV curing stations 116, 126, 136, 146 for curing the printed ink on substrate 150.

Figure 2:
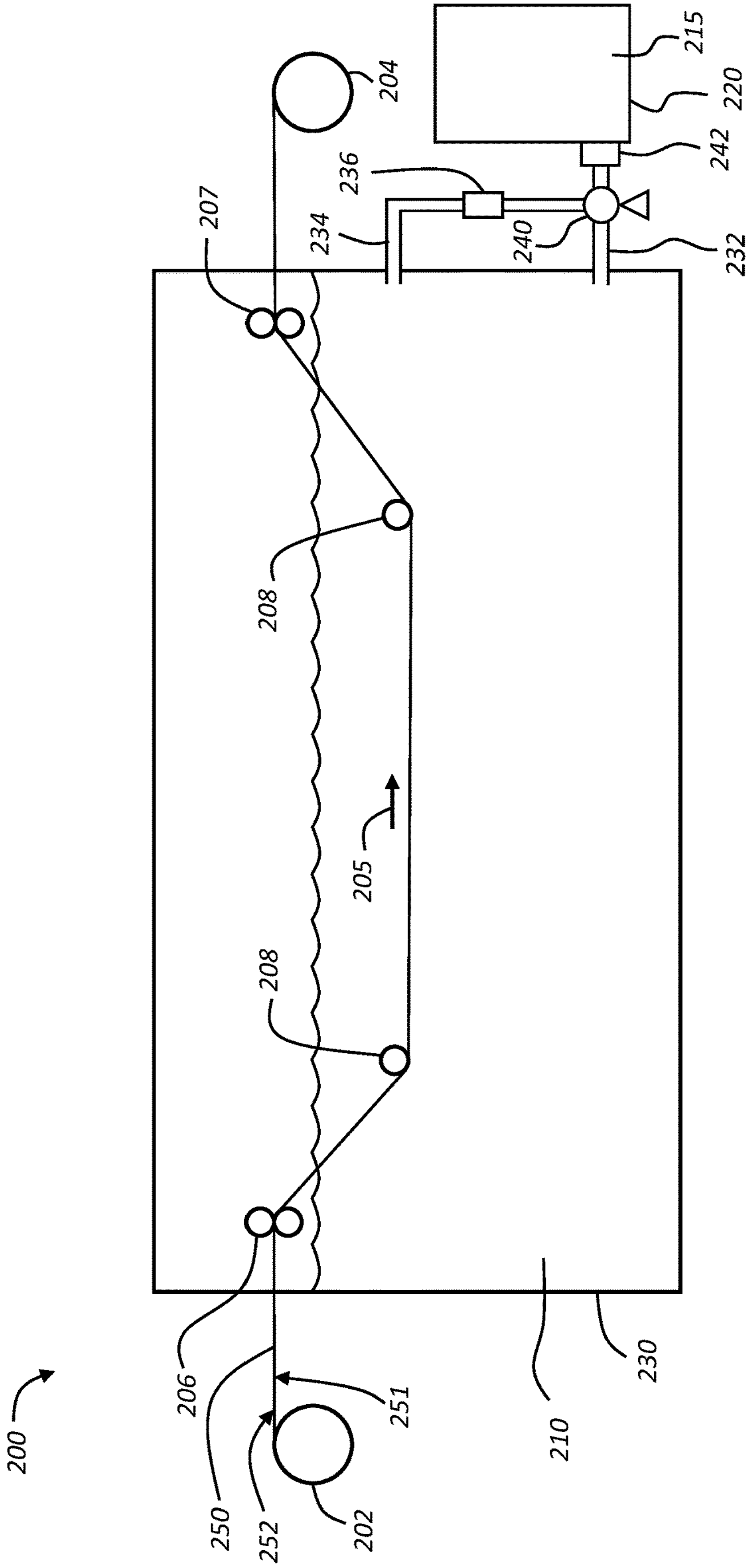
FIG. 2 (Prior Art)
FIG. 2 is a schematic side view of a roll-to-roll electroless plating system.

FIG. 2 is a schematic side view of a roll-to-roll electroless plating system 200 disclosed in commonly-assigned U.S. Patent Application Publication 2016/0168713 to Reuter et al., which is incorporated herein by reference. The electroless plating system 200 includes a tank 230 of plating solution 210. Web of media 250 is fed by a web advance system along a web-transport path in an in-track direction 205 from a supply roll 202 to a take-up roll 204. The web of media 250 is a substrate upon which electroless plating is to be performed. Drive roller 206 is positioned upstream of the plating solution 210 and drive roller 207 is positioned downstream of the plating solution 210. Drive rollers 206 and 207 advance the web of media 250 from the supply roll 202 through the tank of plating solution 210 to the take-up roll 204. Web-guiding rollers 208 are at least partially submerged in the plating solution 210 in the tank 230 and guide the web of media 250 along the web-transport path in the in-track direction 205.

As the web of media 250 is advanced through the plating solution 210 in the tank 230, a metallic plating substance such as copper, silver, gold, nickel or palladium is electrolessly plated from the plating solution 210 onto predetermined locations on one or both of a first surface 251 and a second surface 252 of the web of media 250. As a result, the concentration of the metal or other components in the plating solution 210 in the tank 230 decreases and the plating solution 210 needs to be refreshed. To refresh the plating solution 210, it is recirculated by pump 240, and replenished plating solution 215 from a reservoir 220 is added under the control of controller 242, which can include a valve (not shown). In the example shown in FIG. 2, plating solution 210 is moved from tank 230 to pump 240 through a drain pipe 232 and is returned from pump 240 to tank 230 through a return pipe 234. In order to remove particulates from plating solution 210, a filter 236 can be included, typically downstream of the pump 240.

Figure 3:
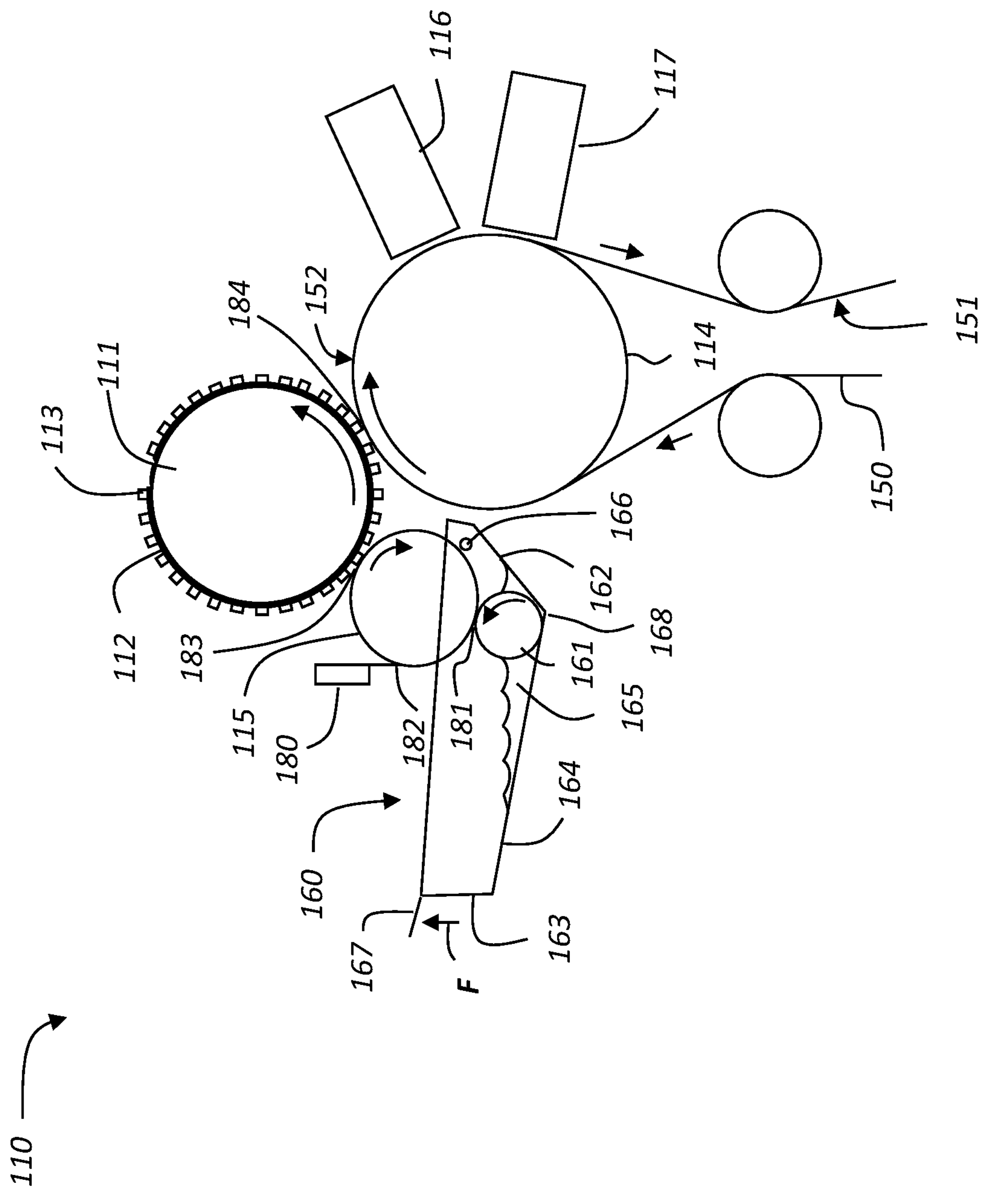
FIG. 3 (Prior Art)
FIG. 3 is a schematic side view of an exemplary printing module in a flexographic printing system.

FIG. 3 shows a close-up side view showing additional details of an exemplary embodiment of the print module 110 of FIG. 1. The illustrated configuration is equivalent to that disclosed in commonly-assigned U.S. Pat. No. 9,327,494 to G. Smith et al., entitled "Flexographic printing system with pivoting ink pan," which is incorporated herein by reference. The print module 110 includes an ink pan 160 with a fountain roller 161 for providing ink to the anilox roller 115. Fountain rollers 161 are sometimes referred to in the art as doctor rollers or metering rollers. Ink pan 160 includes a front wall 162 located nearer to impression cylinder 114, a rear wall 163 located opposite front wall 162 and further away from impression cylinder 114, and a floor 164 extending between the front wall 162 and the rear wall 163. The ink pan 160 also includes two side walls (not shown in FIG. 3) that extend between the front wall 162 and the rear wall 163 on opposite sides of the ink pan 160 and intersect the floor 164. It should be noted that there may or may not be distinct boundaries between the front wall 162, the rear wall 163, the floor 164 and the side walls. In some embodiments, some or all of the boundaries between these surfaces can be joined using rounded boundaries that smoothly transition from one surface to the adjoining surface.

Fountain roller 161 is partially immersed in an ink 165 contained in ink pan 160. Within the context of the present invention, the ink 165 can be any type of marking material, visible or invisible, to be deposited by the flexographic printing system 100 (FIG. 1) on the substrate 150. Fountain roller 161 is rotatably mounted on ink pan 160. Ink pan 160 is pivotable about pivot axis 166, preferably located near the front wall 162.

A lip 167 extends from rear wall 163. When an upward force F is applied to lip 167 as in FIG. 3, ink pan 160 pivots upward about pivot axis 166 until fountain roller 161 contacts anilox roller 115 at contact point 181. In the upwardly pivoted ink pan 160 the floor 164 tilts downward from rear wall 163 toward the front wall 162 so that fountain roller 161 is located near a lowest portion 168 of floor 164. If upward force F is removed from lip 167, ink pan 160 pivots downward under the influence of gravity so that fountain roller 161 is no longer in contact with anilox roller 115.

A flexographic printing plate 112 (also sometimes called a flexographic master) is mounted on plate cylinder 111. In an exemplary configuration, the flexographic printing plate 112 is a flexible plate that is wrapped almost entirely around plate cylinder 111. Anilox roller 115 contacts raised features 113 on the flexographic printing plate 112 at contact point 183. As plate cylinder 111 rotates counter-clockwise (in the view shown in FIG. 3), both the anilox roller 115 and the impression cylinder 114 rotate clockwise, while the fountain roller 161 rotates counter-clockwise. Ink 165 that is transferred from the fountain roller 161 to the anilox roller 115 is transferred to the raised features 113 of the flexographic printing plate 112 and from there to second side 152 of substrate 150 that is pressed against flexographic printing plate 112 by impression cylinder 114 at contact point 184.

In order to remove excess amounts of ink 165 from the patterned surface of anilox roller 115 a doctor blade 180, which is mounted to the frame (not shown) of the printing system, contacts anilox roller 115 at contact point 182. Contact point 182 is downstream of contact point 181 and is upstream of contact point 183. For the configuration shown in FIG. 3, in order to position doctor blade 180 to contact the anilox roller 115 downstream of contact point 181 where the fountain roller 161 contacts the anilox roller 115, as well as upstream of contact point 183 where the anilox roller 115 contacts the raised features 113 on the flexographic printing plate 112, doctor blade 180 is mounted on the printer system frame on a side of the anilox roller 115 that is opposite to the impression cylinder 114.

After printing of ink on the substrate, it is cured using UV curing station 116. In some embodiments, an imaging system 117 can be used to monitor line quality of the pattern printed on the substrate.

Figure 4:
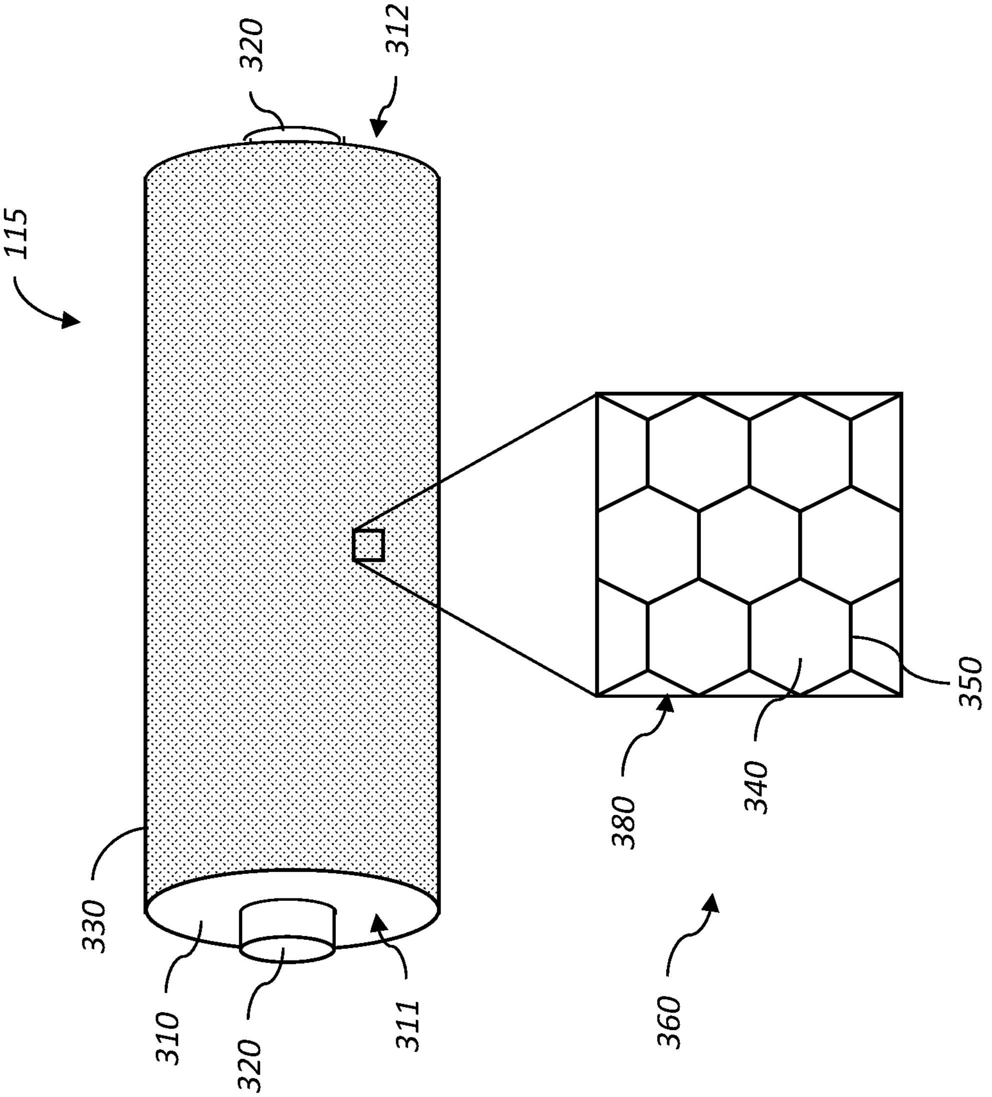
FIG. 4 (Prior Art)
FIG. 4 shows a conventional anilox roller used in flexographic printing processes.

FIG. 4, shows a conventional anilox roller 115 used in a flexographic printing process. The anilox roller 115 controls, in part, the volume of ink or other material transferred to a flexographic printing plate 112 (FIG. 3) during the flexographic printing process. The anilox roller 115 includes a rigid cylinder 310, which is typically constructed of steel, a carbon fiber composite, a carbon fiber composite covered with metal, chrome, or an aluminum core with steel. Roller mounts 320 are disposed on the distal ends 311, 312 of cylinder 310 to secure and rotate the cylinder 310 during the flexographic printing process. Prior to depositing a surface coating 330, the cylinder 310 is typically polished so that a longitudinal contact surface around cylinder 310 is smooth. The surface coating 330 is typically a hard ceramic, but can also be made of other materials such as chrome. After deposition, the surface coating 330 is preferably polished so that a longitudinal contact surface of surface coating 330 around cylinder 310 is smooth. The surface coating 330 is polished smooth because it is the contact surface of the cylinder.

An anilox roller pattern 380 including a plurality of cells 340 separated by walls 350 are patterned into the surface coating 330 as shown in close-up view 360. The cells 340 do not extend into the cylinder 310. Each cell 340 is a small indentation of a predetermined geometry in the surface coating 330 that holds and controls the amount of ink or other material (not shown) to be transferred to the flexographic printing plate 112 during the flexographic printing process. For the cell geometry depicted in FIG. 4, a given cell 340 shares common walls 350 with six neighboring cells 340. However, the number of common walls 350 shared by a given cell 340 may vary depending on the geometry of the cell 340 used in a particular application. Those skilled in the art will recognize that the cells 340 can be formed into the surface coating 330 with a variety of different processes such as etching processes and engraving process.

Figure 5:
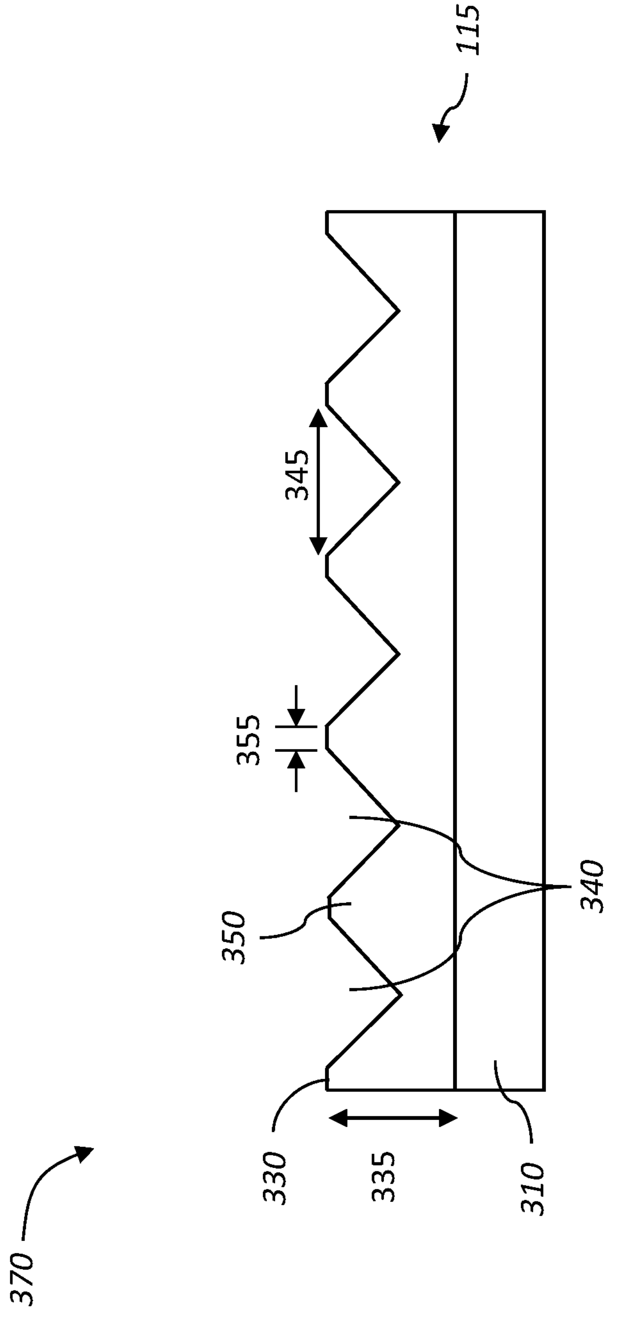
FIG. 5 (Prior Art)
FIG. 5 shows a cross-sectional view through a surface of the anilox roller of FIG. 4.

FIG. 5, shows a cross-sectional view 370 through a surface of the anilox roller 115 of FIG. 4. The surface coating 330 (e.g., a ceramic coating) covers the longitudinal contact surface of cylinder 310, and generally has a thickness 335 of at least 10 microns. A plurality of cells 340 are patterned into the surface coating 330, but do not extend into cylinder 310. The volume of ink or other material (not shown) held by a given cell 340 is typically measured in units of Billion Cubic Microns ("BCMs"). A cell 340 typically holds a volume of at least 0.5 BCM or more of ink or other material suitable for printing standard geometry lines and features. Each cell 340 typically has a cell size 345 of 10 microns or more.

In the depicted cross-section, a common wall 350 is formed between adjacent cells 340 patterned into surface coating 330. The wall 350 is composed entirely of surface coating 330 and has a wall thickness 355, which is typically related to the cell density. As the cell density increases, the thickness 355 of the wall 350 generally decreases. If the thickness 355 of wall 350 becomes too thin, it may break from contact with the doctor blade or the flexographic printing plate during the flexographic printing process or wear out over time from repeated use. If the wall 350 between adjacent cells 340 breaks, a substantially larger cell will be formed, resulting in inconsistent ink transfer volumes. Inconsistent ink transfer volumes can result in print quality issues due to excess inking. Consequently, the cell density may be limited by a minimally sufficient wall thickness 355 that is necessary for reliable use. Typically, the wall 350 has a thickness 355 of 1 micron or more for printing standard geometry lines and features. For example, in one example, the sum of the wall thickness 355 and the cell size 345 of an anilox roller 115 configured to deliver 0.5 BCM with 2000 lpi (lines per inch) is 12.7 microns, with the wall thickness 355 at approximately 1-2 microns and the cell size 345 at approximately 10.7-11.7 microns. For anilox rollers with lower cell density (or lpi), the cell size 345 will increase accordingly.

Figure 6:
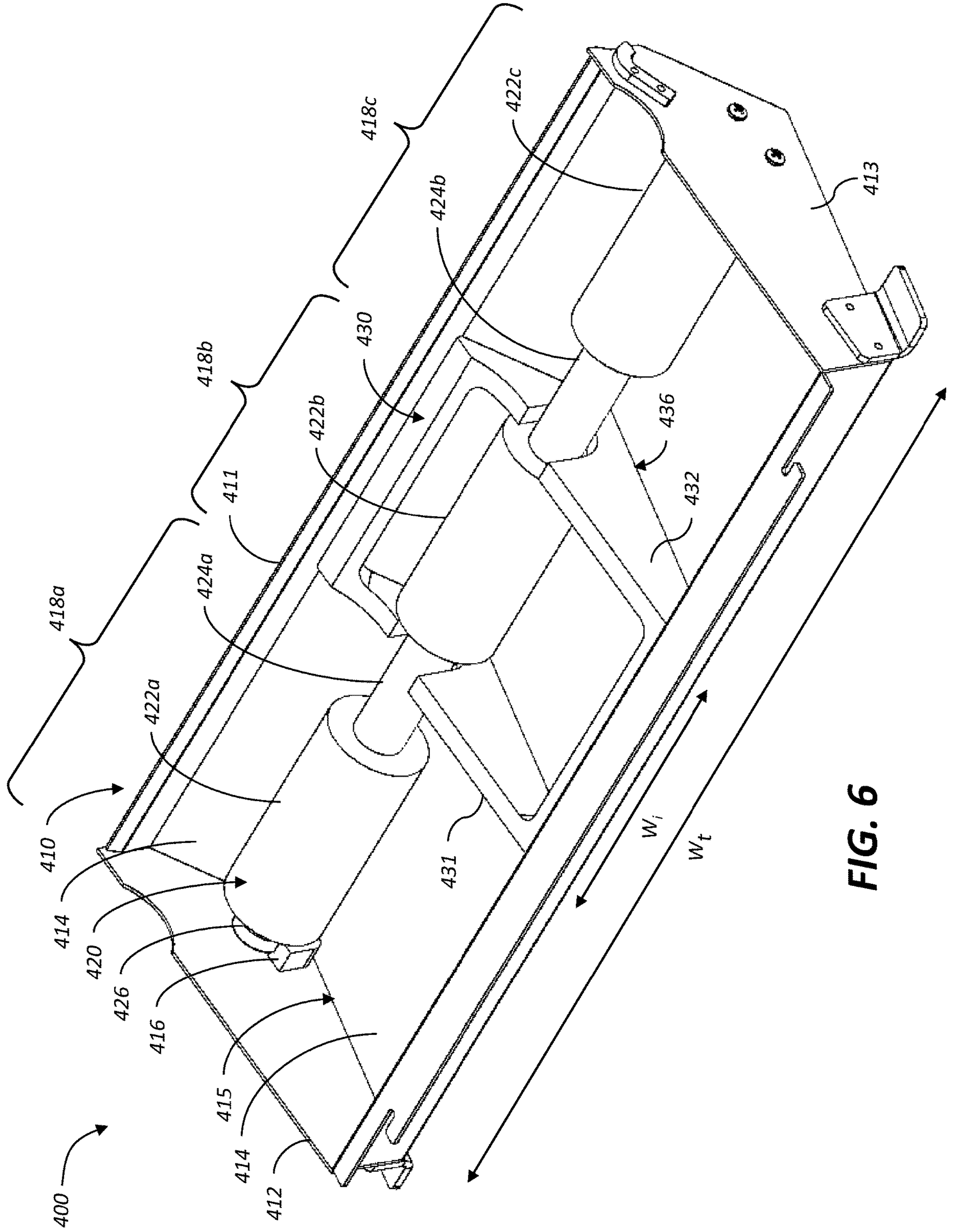
FIGS. 6 and 7 illustrate an exemplary embodiment of an inking system having a segmented ink tray including an ink tray insert.
Figure 7:
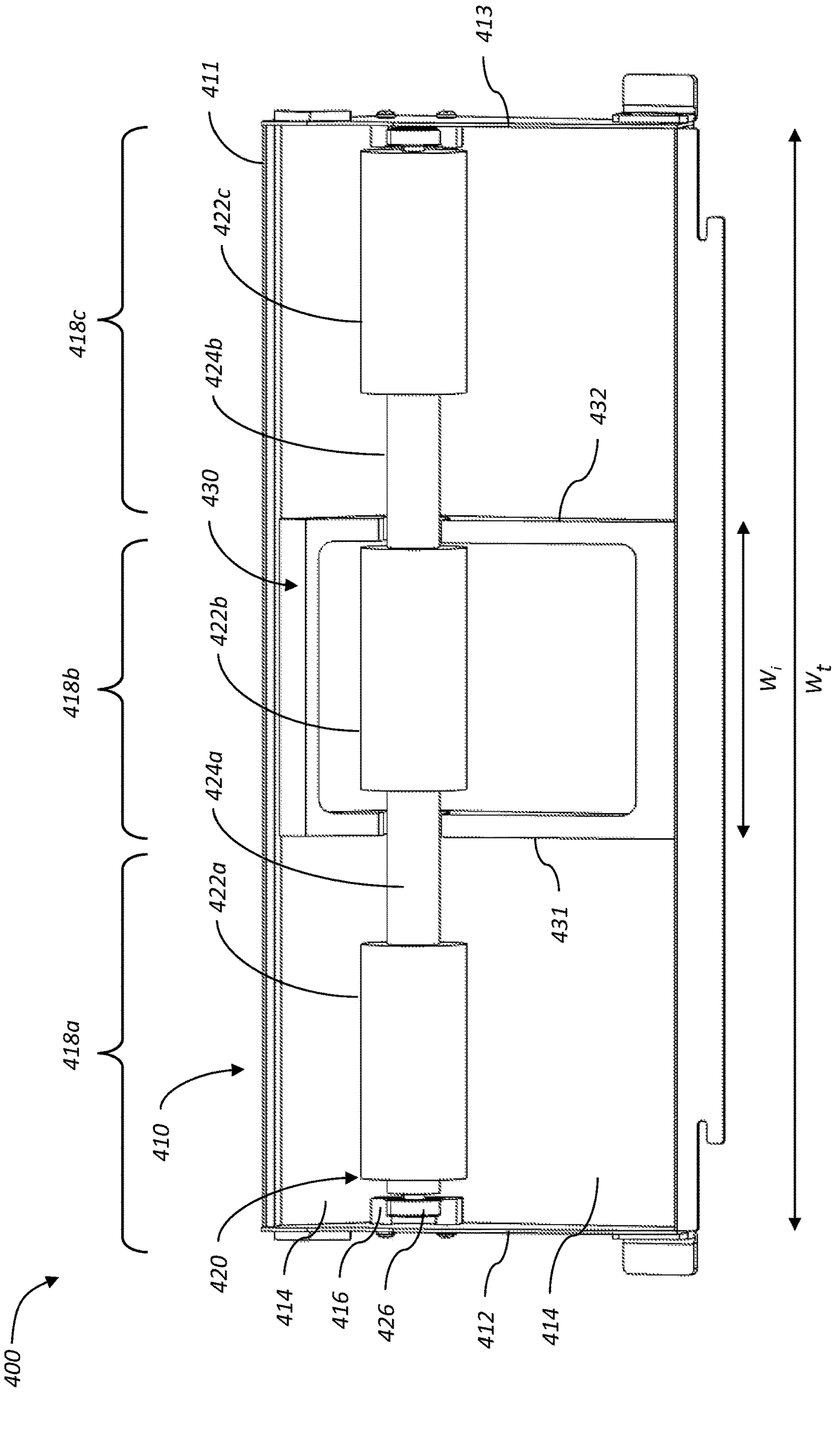

FIGS. 6 and 7 illustrate different views of an inking system 400 for transferring a plurality of different inks to a flexographic printing plate 112 (FIG. 3) via an anilox roller 115 (FIG. 3) in a flexographic printing system 100 (FIG. 1) in accordance with an exemplary embodiment. The inking system 400 transfers ink to the anilox roller 115 using a fountain roller 420 having a plurality of ink transfer zones **422*a*, 422*b*, 422*c* separated by recessed zones 424*a*, 424*b*. The radius of the fountain roller 420 in the recessed zones 424*a*, 424*b* is smaller than the radius of the fountain roller 420 in the ink transfer zones 422*a*, 422*b*, 422*c***.

The exemplary inking system 400 provides the plurality of inks to the ink transfer zones **422*a*, 422*b*, 422*c* of the fountain roller 420 using a segmented ink tray 410 having a plurality of ink tray segments 418*a*, 418*b*, 418*c* corresponding to each of the ink transfer zones 422*a*, 422*b*, 422*c* of the fountain roller 420. In the illustrated embodiment, the segmented ink tray 410 includes an ink tray insert 430 inserted into a conventional ink tray 411. In the illustrated configuration, the ink tray insert 430 is configured to supply ink to the central ink transfer zone 422*b* of the fountain roller 420**.

The fountain roller 420 is positioned such that the ink transfer zones **422*a*, 422*b*, 422*c* contact the cylindrical outer surface of the anilox roller 115 (FIG. 3). Each ink transfer zone 422*a*, 422*b*, 422*c* of the fountain roller 420 is adapted to receive ink from the corresponding ink tray segment 418*a*, 418*b*, 418*c* and transfer the received ink to a corresponding zone of the anilox roller 115. In some embodiments, the anilox roller 115 can be a segmented anilox roller 115 that has characteristics that vary across its cross-track width. For example, the segmented anilox roller can have different characteristics in the zones corresponding to the ink transfer zones 422*a*, 422*b*, 422*c* to control the volume of ink transferred in each zone. In some embodiments, the anilox roller 115 can have surface characteristics in the regions between the ink transfer zones 422*a*, 422*b*, 422*c* to prevent intermixing of the different inks (e.g., the surface can include no cell structure in the regions between the ink transfer zones 422*a*, 422*b*, 422*c***).

The conventional ink tray 411 has end walls 412, 413 and a bottom surface 414. The bottom surface 414 can have a wide variety of shapes. In the illustrated configuration, the bottom surface 414 includes multiple planar segments which together define a composite surface having an inner profile 415. In various embodiments, the planar segments can be joined by sharp boundaries or by rounded boundaries that smoothly transition from one segment to another. In some embodiments, the bottom surface 414 can include one or more curved non-planar segments. Bearing saddles 416 are mounted adjacent to the end walls 412, 413 and are adapted to receive bearings 426 mounted on the shaft of the fountain roller 420.

Figure 8:
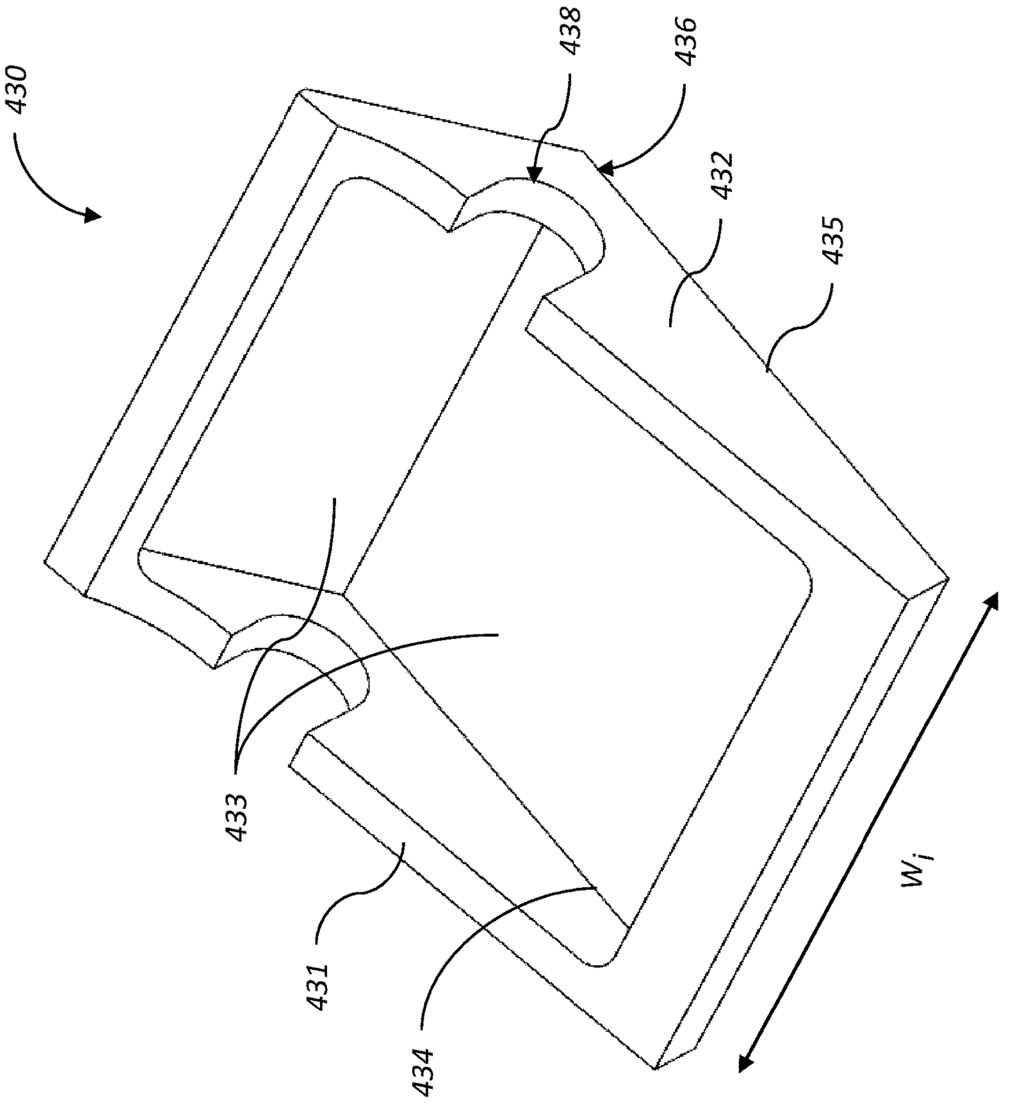
FIG. 8 shows an exemplary ink tray insert.

The ink tray insert 430, which is shown in more detail in FIG. 8, has a bottom surface 433, a left side wall 431 that extends upward from a left edge 434 of the bottom surface 433 and a right side wall 432 that extends upward from a right edge 435 of the bottom surface 433. The left and right side walls 431, 432 are configured to extend into the recessed zones 424*a*, 424*b* of the fountain roller 420. In the illustrated configuration, the left and right side walls 431, 432 include notches 438 into which the recessed zones 424*a*, 424*b* of the fountain roller 420 fit.

The ink tray insert 430 has an outer profile 436 that substantially conforms to the inner profile 415 of the bottom surface 414 of the conventional ink tray 411 such that the ink tray insert 430 fits snugly within the conventional ink tray 411. Within the context of the present disclosure "substantially conforms to" means that the ink tray insert 430 fits within the conventional ink tray 411 such that any gaps between the outer profile 436 of the ink tray insert 430 and the inner profile 415 of the conventional ink tray are less than 3 mm, and preferably less than 1 mm. The bottom surface 433 of the ink tray insert 430 should be thin enough such that the outer surface of the fountain roller 420 in the ink transfer zone 422*b* does not come into contact with the bottom surface 433 when the fountain roller is mounted in the conventional ink tray 411. In an exemplary embodiment, acceptable clearance was obtained when the thickness of the bottom surface 433 was set to be 0.040". The ink tray insert should preferably be made of a material which is washable and sufficiently rigid given the thicknesses of the left and right side walls 431, 432 and bottom surface 433 to provide durability and robustness when it is being handled. In an exemplary embodiment, the ink tray insert 430 is machined from high-density polyethylene (HDPE), and the thickness of the left and right side walls 431, 432 is 0.125". In an alternate embodiment, the left and right side walls 431, 432 and the bottom surface 433 of the ink tray insert 430 are laser cut from 304 stainless steel, then formed and welded.

In the illustrated configuration, a single ink tray insert 430 is used to supply ink in ink tray segment 418*b* to a single ink transfer zone 422*b* of the fountain roller 420. Ink is added to the conventional ink tray 411 in the ink tray segments 418*a*, 418*c* to supply ink to the other ink transfer zones 422*a*, 422*c*. In other configurations, a plurality of ink tray inserts 430 can be used to supply ink to a corresponding plurality of the ink transfer zones 422*a*, 422*b*, 422*c* of the fountain roller 420. In some configurations, an ink tray insert 430 is provided for each of the ink transfer zones 422*a*, 422*b*, 422*c*.

In various embodiments, the inks supplied in each of the ink transfer zones 422*a*, 422*b*, 422*c* can be the same or different. In an exemplary embodiment, the ink tray insert 430 is used to supply a transparent ink to the central ink transfer zone 422*b*, and an opaque ink is supplied to the outer ink transfer zones 422*a*, 422*c* (for example, to print fiducial marks that are useful for aligning the printed pattern). Within the context of the present disclosure, a transparent ink (sometimes referred to as a colorless ink) is one which produces a printed pattern that changes the optical density (either in transmission or reflection) by less than 0.1 in a specified detection wavelength range, and an opaque ink is one which produces a printed pattern that changes the optical density by at least 0.3 in a specified detection wavelength range. Examples of transparent inks would include dielectric inks, adhesive inks, silver nanowire inks, carbon nanotube inks, polymeric inks, and inks having a low-concentration of various particulates which are useful for various applications including printed electronics applications and security feature printing applications.

In other embodiments, any appropriate inks can be utilized in the different ink transfer zones 422*a*, 422*b*, 422*c*, which can have corresponding transparency characteristics, which can include cases where all of the inks are transparent. For example, in some exemplary embodiments, a high-cost ink is supplied in one ink transfer zone 422*b* (e.g., a functional ink that is useful for forming electrical components), and a low-cost ink is supplied in other ink transfer zones 422*a*, 422*c* (e.g., an opaque ink for printing fiducial marks that are useful for aligning the printed pattern). Within the context of the present disclosure, a "low-cost ink" is one that has a lower cost per unit volume than the "high-cost ink." An example of a high-cost ink would be a conductive ink including silver particles which are useful for some printed electronics applications. Other high-cost inks would include many specialty functional inks.

In other applications, different inks are required at different cross-track locations in accordance with the layout of the pattern being printed. In this case, corresponding inks can be supplied in each of the different ink transfer zones 422*a*, 422*b*, 422*c* in accordance with such embodiments.

The use of the one or more ink tray inserts 430 has the advantage that a conventional ink tray 411 can easily be converted into a segmented ink tray 410 such that a plurality of different inks can be supplied in a conventional printing system in different ink transfer zones 422*a*, 422*b*, 422*c*. It has the additional advantage that a smaller volume of ink can be used to supply ink to a particular ink transfer zone 422*b* having a cross-track width $W_i$ that is substantially narrower than the cross-track width $W_t$ of the conventional ink tray 411. Typically, $W_i$ will be less than $W_t/2$, and often will be less than $W_t/3$. This can be particularly advantageous when the supplied ink has a high cost. The use of the ink tray inserts 430 has the additional advantage that they can be easily removed such that any unused ink can be recovered from the ink tray insert 430. The ink tray inserts 430 of the present invention have the advantage over other products, such as the disposable pan liners available from DIPCO of Delta, CO that are not made of a rigid material, that they can be easily cleaned and reused, thus providing improved sustainability.

Figure 9:
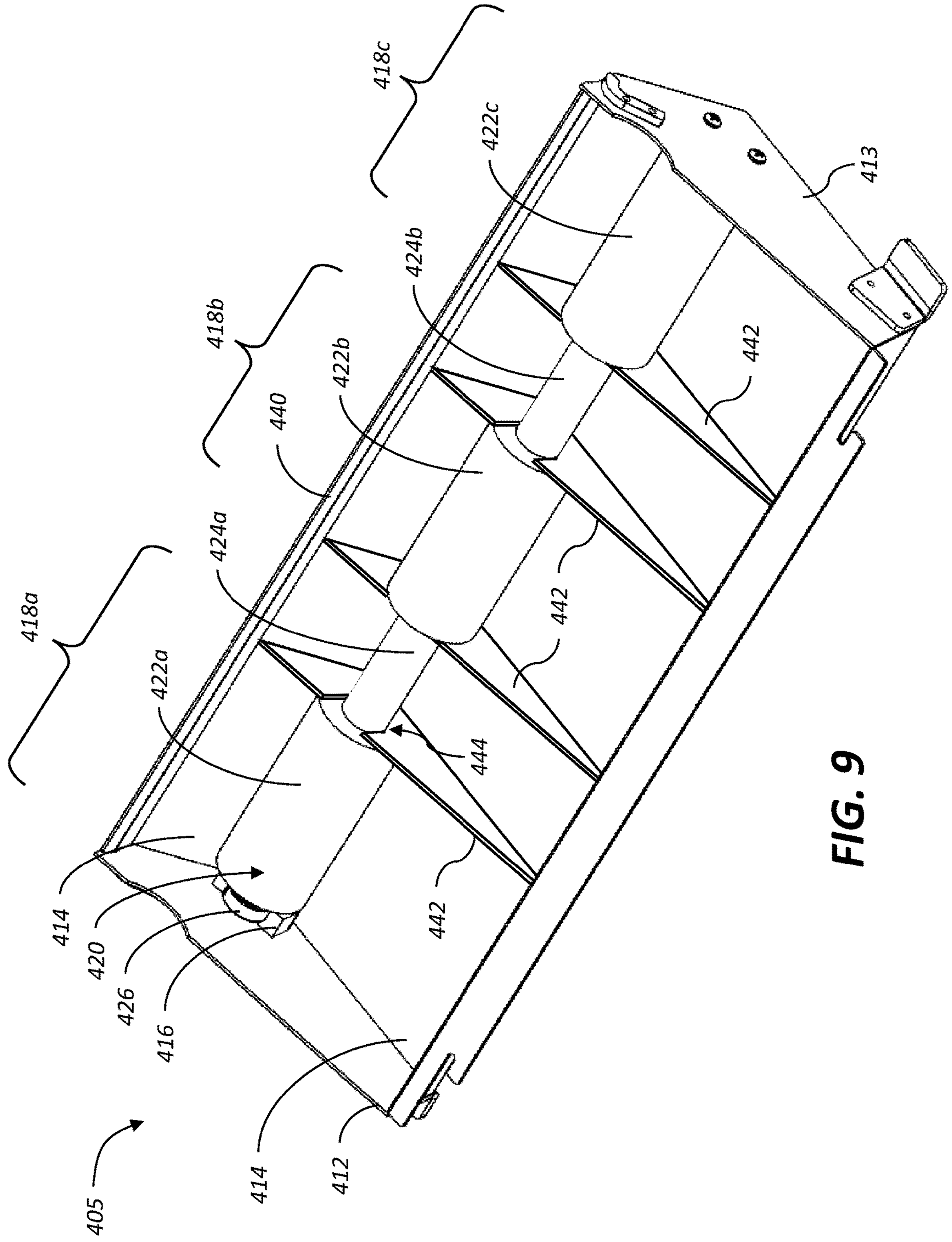
FIG. 9 illustrates an alternate embodiment of an inking system having a segmented ink tray.

FIG. 9 illustrates an alternate embodiment of an inking system 405 utilizing a segmented ink tray 440 having fixed dividing walls 442 that separate the segmented ink tray 440 into the plurality of ink tray segments 418*a*, 418*b*, 418*c*. Fountain roller 420 is positioned within the segmented ink tray 440 and functions in a manner similar to FIG. 6, which was discussed earlier. The dividing walls 442 extend into the recessed zones 424*a*, 424*b* of the fountain roller 420. In the illustrated configuration, the dividing walls 442 have notches 444 into which the recessed zones 424*a*, 424*b* of the fountain roller 420 fit.

Figure 10A:
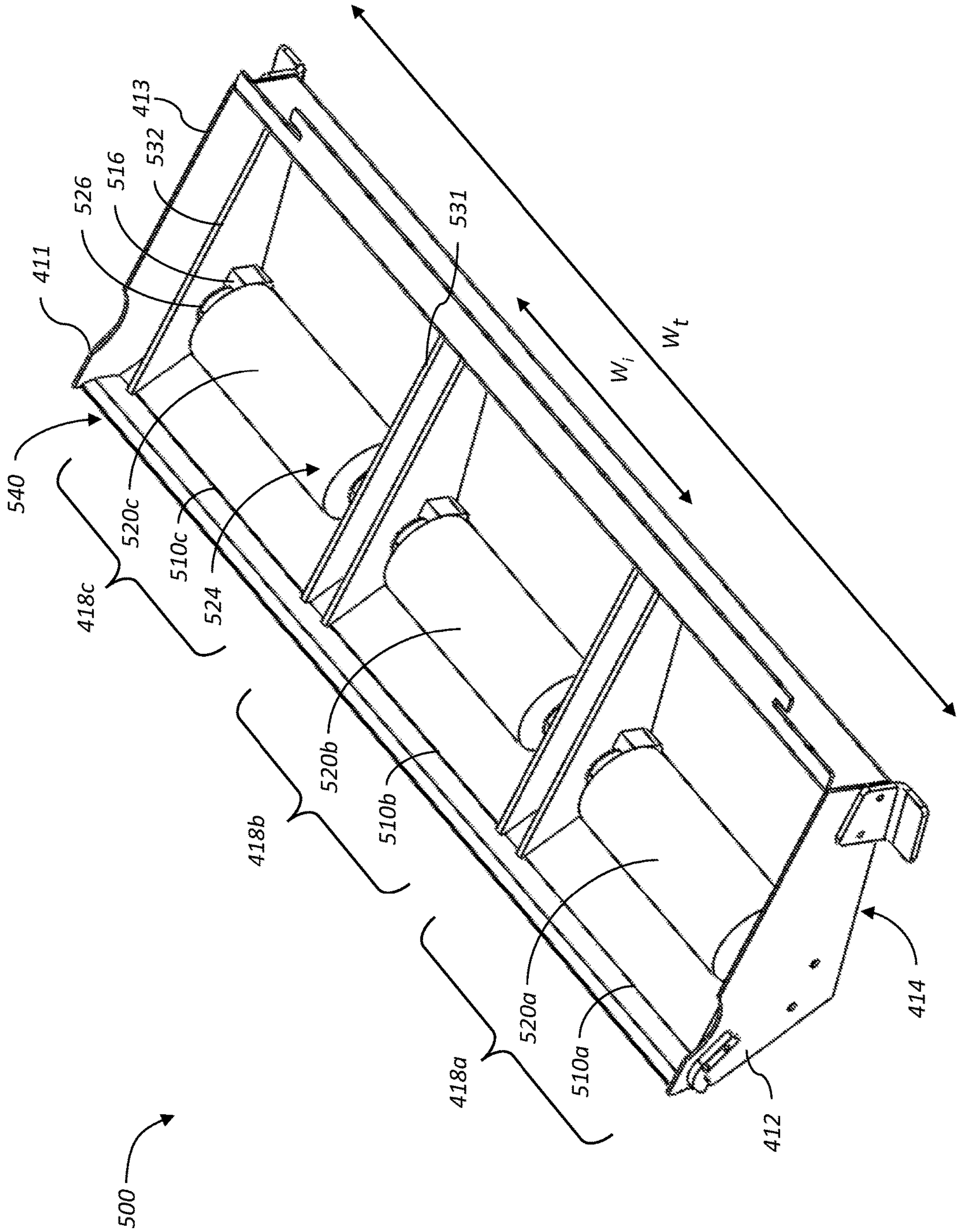
FIGS. 10A-10B illustrate an exemplary embodiment including a plurality of ink tray inserts and corresponding fountain roller elements.

FIG. 10A illustrates an alternate embodiment of an inking system 500 employing a segmented ink tray 540 including a plurality of ink tray inserts 510*a*, 510*b*, 510*c*, each of which utilizes a corresponding fountain roller element 520*a*, 520*b*, 520*c*. Each fountain roller element 520*a*, 520*b*, 520*c* has a corresponding ink transfer zone 524. In an exemplary embodiment, the ink tray inserts 510*a*, 510*b*, 510*c* are adapted to fit within a conventional ink tray 411 to provide a segmented ink tray 508. The ink tray inserts 510*a*, 510*b*, 510*c* include bearing saddles 516 mounted adjacent to side walls 531, 532 which are adapted to receive bearings 526 mounted on shafts 522 (see FIG. 11B) of the fountain roller elements 520*a*, 520*b*, 520*c* such that the fountain roller elements 520*a*, 520*b*, 520*c* are aligned in a coaxial configuration. The coaxial fountain roller elements 520*a*, 520*b*,

520*c* can collectively be referred to as a "fountain roller system." The fountain roller elements 520*a*, 520*b*, 520*c* can also be referred to as "short fountain rollers" reflecting the fact that the cross-track widths of the ink transfer zones 524 are shorter than the cross-track width of the substrate 150 (FIG. 1) being printed on, as well as the cross-track width of the conventional ink tray 411. Within the context of the present disclosure, a short fountain roller is one having an ink transfer zone 524 with a cross-track width that is less than 50% of the cross-track width of the substrate 150.

Figure 10B:
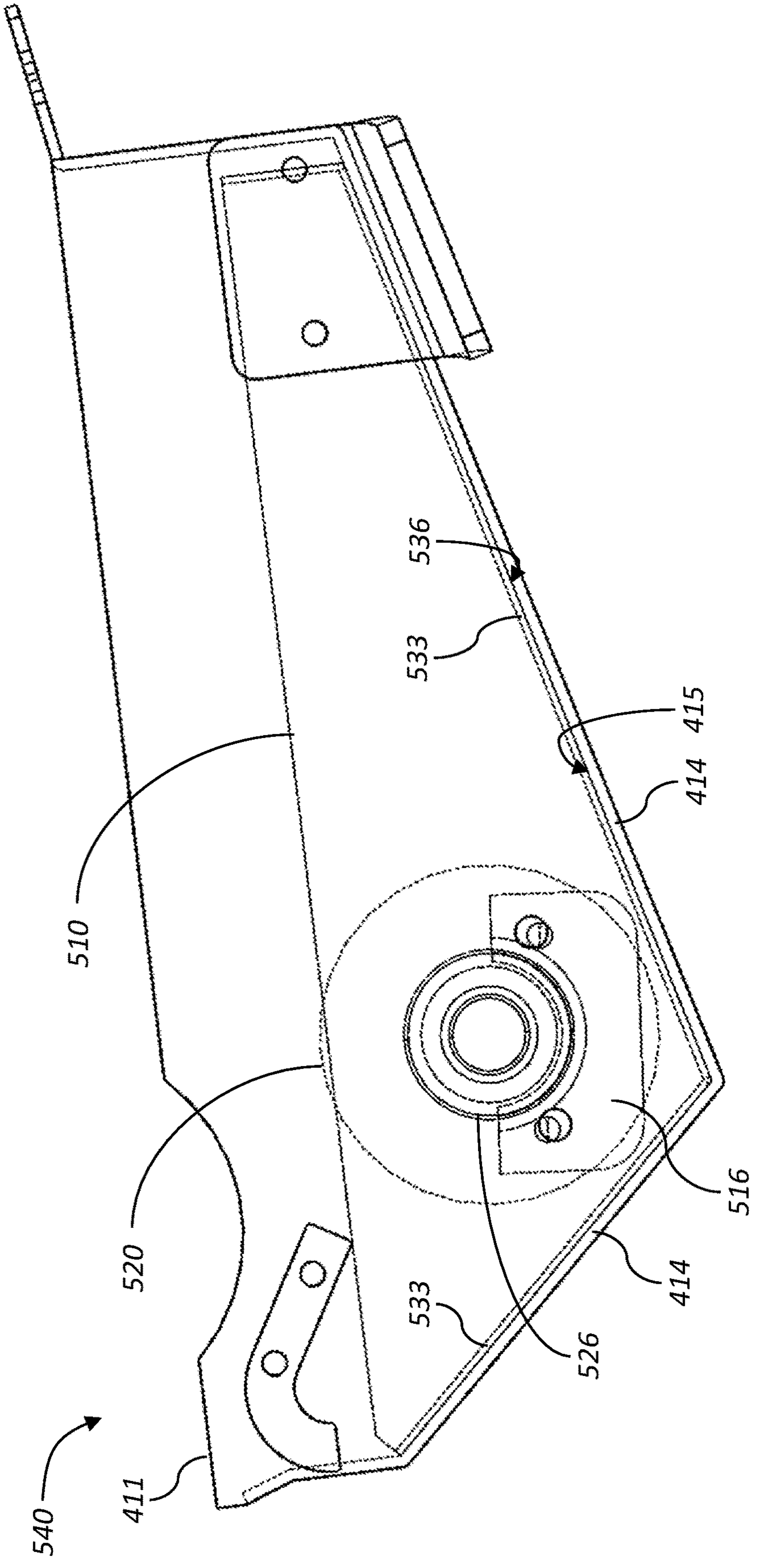

FIG. 10B shows a side view of the inking system 500 with a representative ink tray insert 510 and fountain roller element 520. The ink tray inserts 510 have a bottom surface 533 with an outer profile 536 that substantially conforms to the inner profile 415 of the conventional ink tray 411.

Figure 11B:
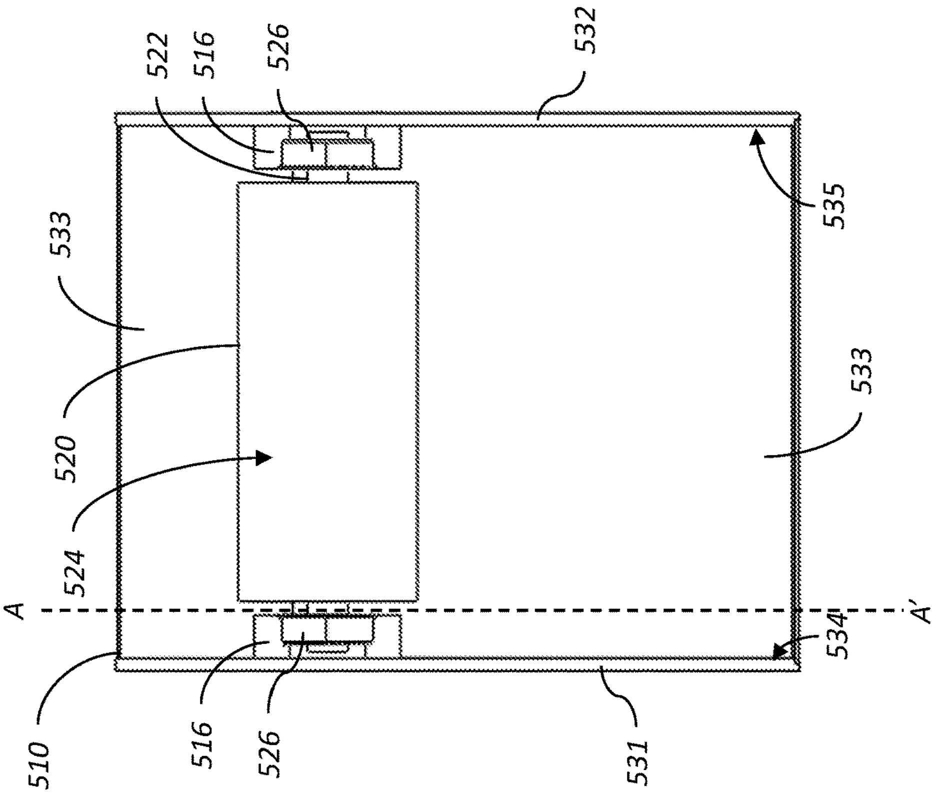
FIGS. 11A-11C illustrate additional details of the ink tray segments of FIG. 10A.
Figure 11A:
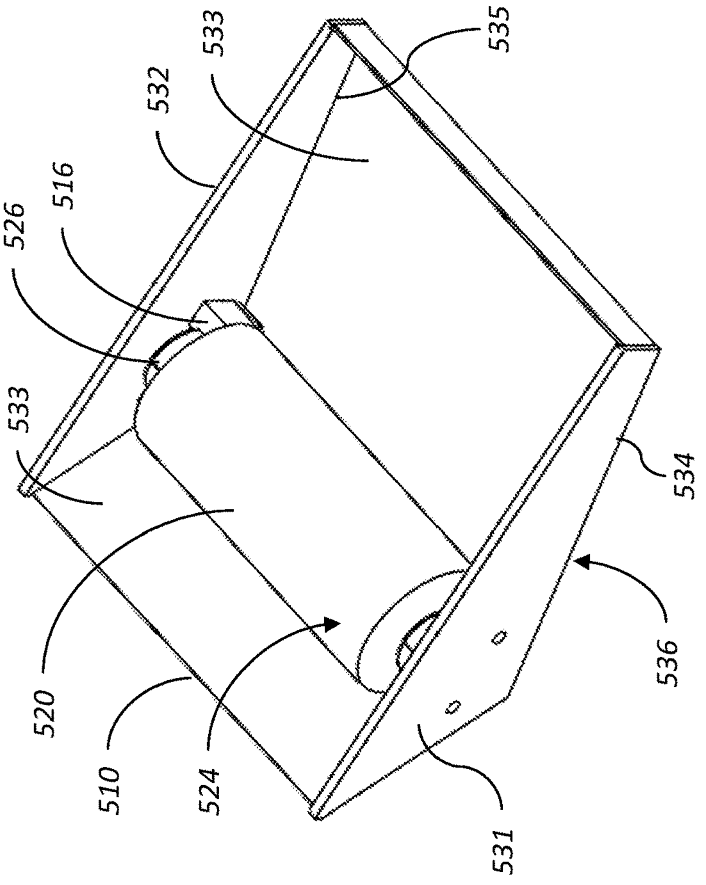
Figure 11C:
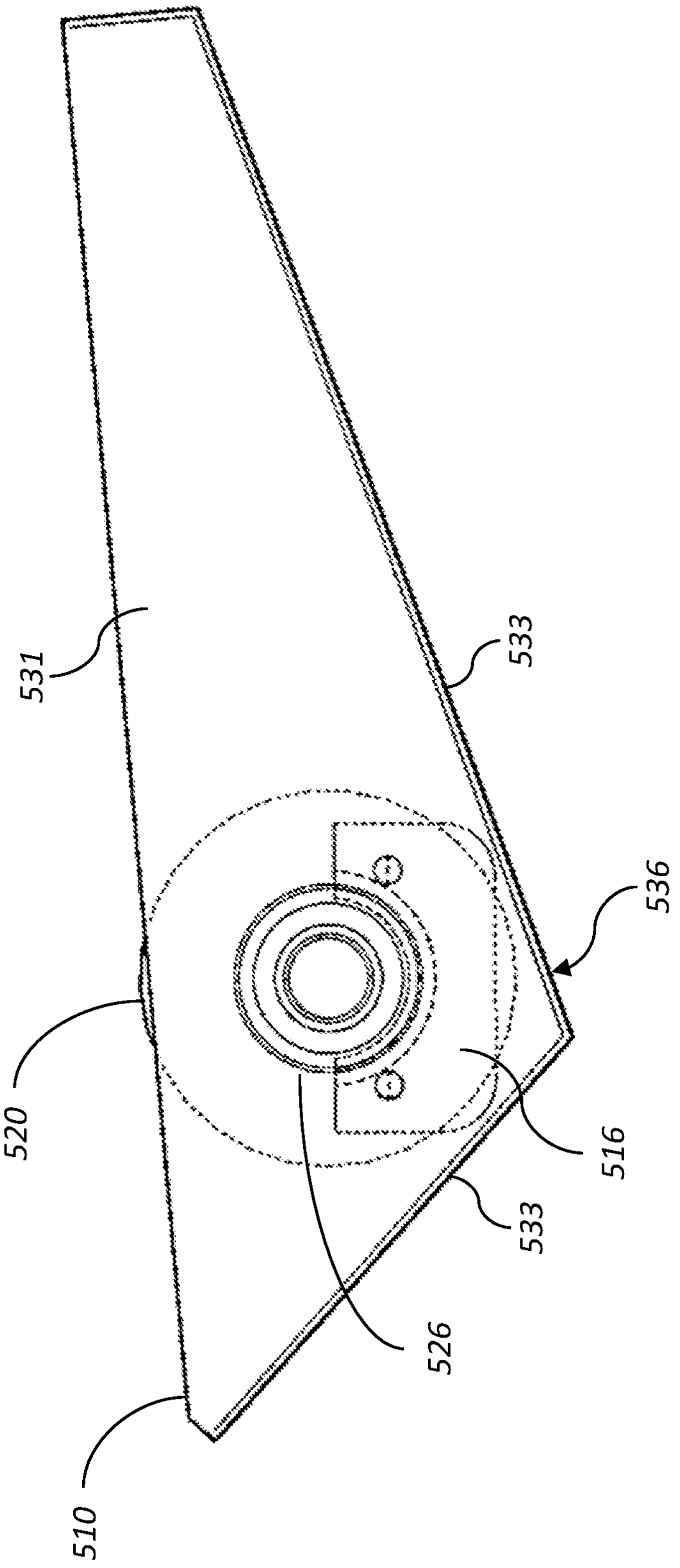

FIGS. 11A-11C show additional details of ink tray insert 510 according to an exemplary embodiment. The ink tray insert 510 includes left and right side walls 531, 532 which extend upwards from left and right edges 534, 535, respectively, of the bottom surface 533. Bearing saddles 516 are mounted adjacent to the side walls 531, 532 and are used to mount fountain roller element 520 within the ink tray insert 510.

Figure 12:
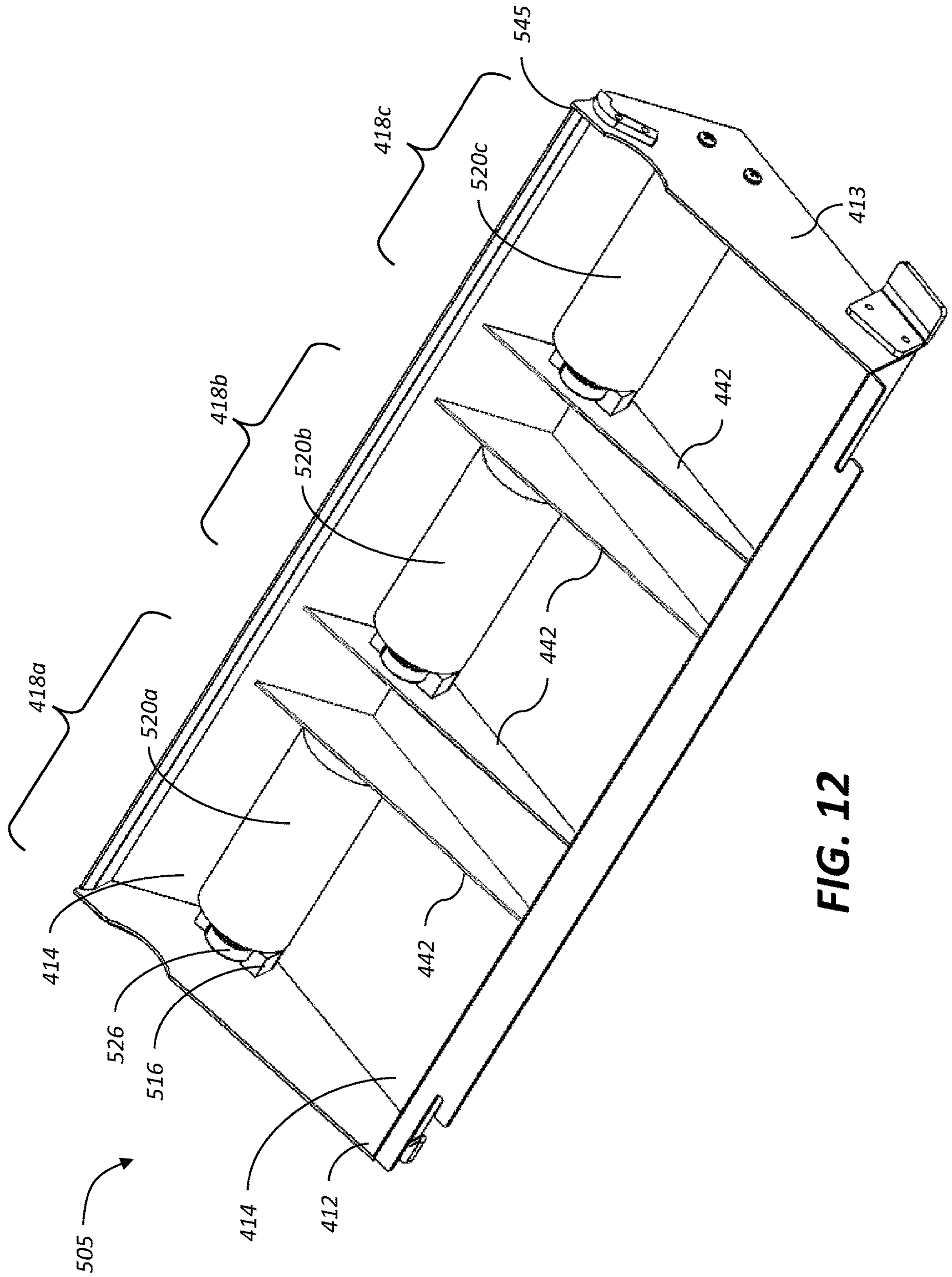
FIG. 12 illustrates an alternate embodiment including a segmented ink tray and a plurality of fountain roller elements.

FIG. 12 illustrates an alternate embodiment of an inking system 505 using a segmented ink tray 545 including fixed dividing walls 442 that separate the segmented ink tray 545 into the plurality of ink tray segments 418*a*, 418*b*, 418*c*. Bearing saddles 516 adapted to receive bearings 526 mounted on shafts of the fountain roller elements 520*a*, 520*b*, 520*c* are mounted adjacent to the end walls 412, 413 and the dividing walls 442. This enables convenient installation and removal of the fountain roller elements 520*a*, 520*b*, 520*c*. Other elements of the inking system 505 are similar to the inking system 405 discussed earlier with respect to FIG. 9.

Figure 13A:
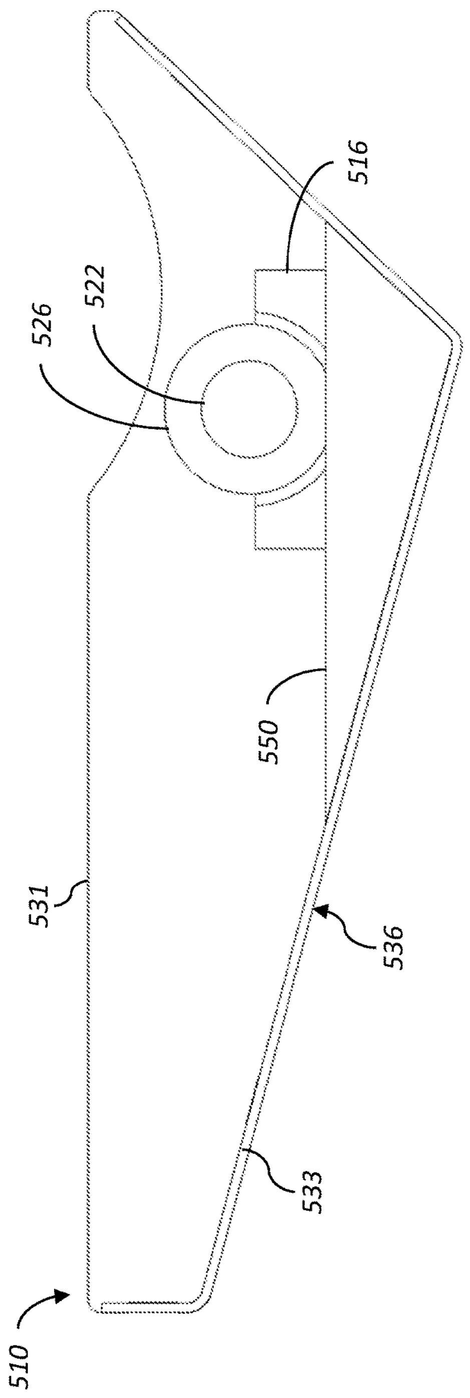
FIG. 13A shows a cross section through the ink tray insert of FIG. 11B.

FIG. 13A shows a cross section through the ink tray insert 510 of FIG. 11B, taken through cut line A-A'. The ink tray insert 510 is shown as being loaded with a volume of ink 550 which is deep enough so that it covers a lower portion of the bearing 526. This permits ink to seep in between the bearing 526 and the bearing saddle 516. This has the disadvantage that it can be difficult to clean the ink tray insert 510 and the bearing 526 of the fountain roller element 520 (e.g., when changing inks or recovering unused ink).

Figure 13B:
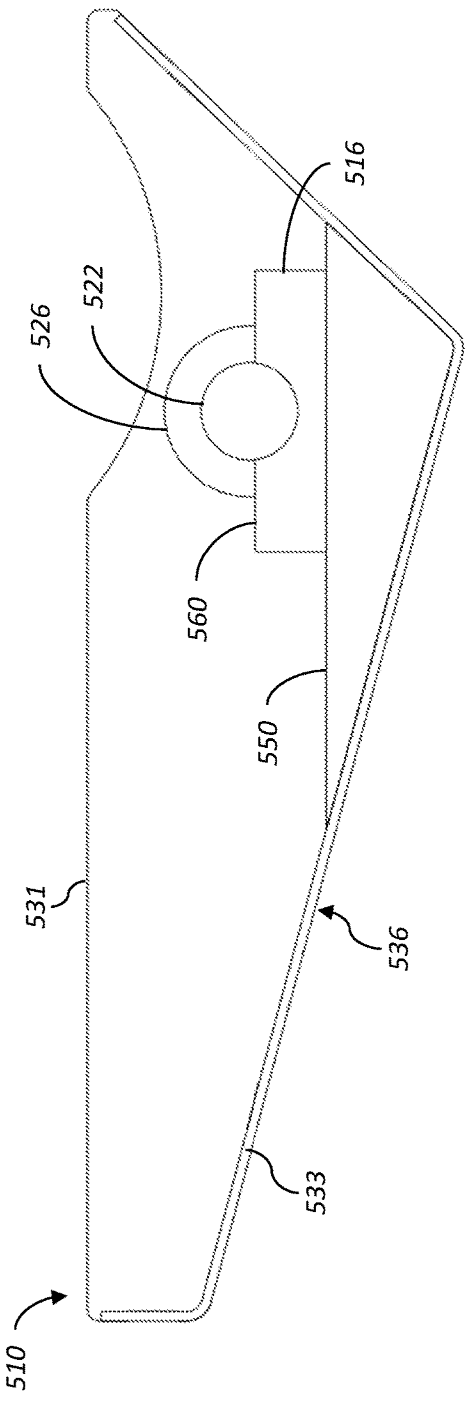
FIG. 13B shows a cross section through an alternate ink tray insert configuration including a bearing guard.

FIG. 13B illustrates an alternate configuration which mitigates this disadvantage. In this case, a bearing guard 560 is added to the inward faces of the bearing saddle 516 which shields a lower portion of the bearing 526 such that ink cannot penetrate in between the bearing 526 and the bearing saddle 516. In the exemplary configuration of FIG. 13B, the bearing guard 560 has a notch in the upper edge sized to receive the shaft 522 of the fountain roller element 520 (FIG. 11B). In other configurations, the bearing guard 560 can have other shapes. For example, it can have a horizontal upper edge that extends to a height that is just below the shaft 522 of the fountain roller element 520.

The invention has been described in detail with particular reference to certain preferred embodiments thereof, but it will be understood that variations and modifications can be effected within the spirit and scope of the invention.

PARTS LIST

100 flexographic printing system
102 supply roll
104 take-up roll
105 process direction
106 roller
107 roller
110 print module
111 plate cylinder
112 flexographic printing plate
113 raised features
114 impression cylinder
115 anilox roller
116 UV curing station
117 imaging system
120 print module
121 plate cylinder
122 flexographic printing plate
124 impression cylinder
125 anilox roller
126 UV curing station
130 print module
131 plate cylinder
132 flexographic printing plate
134 impression cylinder
135 anilox roller
136 UV curing station
140 print module
141 plate cylinder
142 flexographic printing plate
144 impression cylinder
145 anilox roller
146 UV curing station
150 substrate
151 first side
152 second side
160 ink pan
161 fountain roller
162 front wall
163 rear wall
164 floor
165 ink
166 pivot axis
167 lip
168 lowest portion
180 doctor blade
181 contact point
182 contact point
183 contact point
184 contact point
200 electroless plating system
202 supply roll
204 take-up roll
205 in-track direction
206 drive roller
207 drive roller
208 web-guiding roller
210 plating solution
215 replenished plating solution
220 reservoir
230 tank
232 drain pipe
234 return pipe
236 filter
240 pump
242 controller
250 web of media
251 first surface
252 second surface
310 cylinder
311 end
312 end

320 roller mount
330 surface coating
335 thickness
340 cell
345 cell size
350 wall
355 thickness
360 close-up view
370 cross-sectional view
380 anilox roller pattern
400 inking system
405 inking system
410 segmented ink tray
411 ink tray
412 end wall
413 end wall
414 bottom surface
415 inner profile
416 bearing saddle
418*a* ink tray segment
418*b* ink tray segment
418*c* ink tray segment
420 fountain roller
422*a* ink transfer zone
422*b* ink transfer zone
422*c* ink transfer zone
424*a* recessed zone
424*b* recessed zone
426 bearing
430 ink tray insert
431 side wall
432 side wall
433 bottom surface
434 edge
435 edge
436 outer profile
438 notch
440 segmented ink tray
442 dividing wall
444 notch
500 inking system
505 inking system
508 segmented ink tray
510 ink tray insert
510*a* ink tray insert
510*b* ink tray insert
510*c* ink tray insert
516 bearing saddle
520 fountain roller element
520*a* fountain roller element
520*b* fountain roller element
520*c* fountain roller element
522 shaft
524 ink transfer zone
526 bearing
531 side wall
532 side wall
533 bottom surface
534 edge
535 edge
536 outer profile
540 segmented ink tray
545 segmented ink tray
550 ink
560 bearing guard
F force
$W_i$ cross-track width
$W_t$ cross-track width

The invention claimed is:

1. An inking system, comprising:

an ink tray insert for inserting into an ink tray in a printing system, and the ink tray insert including:

a bottom surface having an outer profile that substantially conforms to an inner profile of a bottom surface of the ink tray; and left and right side walls that extend upwards from left and right edges of the bottom surface, respectively; and bearing saddles mounted inside of and adjacent to each of left and right side walls, which bearing saddles are adapted to receive bearings mounted on a shaft of a fountain roller, the ink tray insert being adapted to supply ink to the fountain roller in an ink transfer zone, wherein a cross-track width of the ink tray insert between the left and right side walls is less than a cross-track width of the ink tray.

2. The inking system of claim 1, wherein a plurality of ink tray inserts are present within the ink tray.

3. The inking system of claim 2, wherein different inks are supplied by at least two of the plurality of ink tray inserts.

4. The inking system of claim 3, wherein ink supplied by one of the plurality of ink tray inserts is a transparent ink and the ink supplied by another of the plurality of ink tray inserts is an opaque ink.

5. The inking system of claim 3, wherein ink supplied by one of the plurality of ink tray inserts is a high-cost ink and the ink supplied by another of the plurality of ink tray inserts is a low-cost ink having a lower cost per unit volume than the high-cost ink.

6. The inking system of claim 1, further comprising the fountain roller mounted within the ink tray insert, the fountain roller comprising bearings mounted on a shaft and being adapted to transfer ink supplied by the ink tray insert to an anilox roller, the anilox roller having a cylindrical outer surface having a plurality of cells, the cells being indentations in the outer surface of the anilox roller configured to transfer ink to a flexographic printing plate.

7. The inking system of claim 6, further comprising the anilox roller.

8. The inking system of claim 1, wherein the cross-track width of the ink tray insert between the left and right side walls is less than one half of the cross-track width of the ink tray.

9. The inking system of claim 1, further including bearing guards positioned on inward faces of the bearing saddles that shield a lower portion of the bearings such that ink cannot penetrate in between the bearings and the bearing saddles.

* * * * *